United States Patent
Zong et al.

(10) Patent No.: US 8,135,280 B2
(45) Date of Patent: Mar. 13, 2012

(54) METHOD AND SYSTEM FOR POWER STABILITY CONTROL IN WAVELENGTH DIVISION MULTIPLEXING NETWORKS

(75) Inventors: Lei Zong, Princeton, NJ (US); Ting Wang, Princeton, NJ (US); Takefumi Oguma, Tokyo (JP); Katsuyuki Mino, Tokyo (JP); Osamu Matsuda, Tokyo (JP)

(73) Assignees: NEC Laboratories America, Inc., Princeton, NJ (US); NEC Corporation (JP)

( * ) Notice: Subject to any disclaimer, the term of this patent is extended or adjusted under 35 U.S.C. 154(b) by 1021 days.

(21) Appl. No.: 12/050,465

(22) Filed: Mar. 18, 2008

(65) Prior Publication Data

US 2009/0092391 A1    Apr. 9, 2009

Related U.S. Application Data

(60) Provisional application No. 60/978,277, filed on Oct. 8, 2007.

(51) Int. Cl.
*H04J 14/02* (2006.01)

(52) U.S. Cl. .................. 398/94; 398/38; 398/79; 398/34
(58) Field of Classification Search .................... 398/38, 398/94, 33, 34, 79, 25, 15, 14
See application file for complete search history.

(56) References Cited

U.S. PATENT DOCUMENTS

| 7,630,644 | B2 * | 12/2009 | Yamamoto et al. ............. 398/83 |
|---|---|---|---|
| 2002/0131698 | A1 | 9/2002 | Wilde |
| 2003/0058507 | A1 | 3/2003 | Oomori |
| 2004/0136055 | A1 | 7/2004 | Michie et al. |
| 2004/0146302 | A1 | 7/2004 | Balland et al. |
| 2006/0215716 | A1 | 9/2006 | Luo et al. |

* cited by examiner

*Primary Examiner* — M. R. Sedighian
(74) *Attorney, Agent, or Firm* — James Bitetto; Joseph Kolodka

(57) ABSTRACT

Methods and systems for controlling power fluctuations in a network including a plurality of nodes are disclosed. A node in the network may be configured to modify power levels in accordance with either an active state or an inactive state. The node may transition to an inactive state in response to a power change that exceeds a power change threshold. The role of the node in controlling the power fluctuation in the network is reduced in the inactive state.

18 Claims, 10 Drawing Sheets

METHOD AND SYSTEM FOR POWER STABILITY CONTROL IN WAVELENGTH DIVISION MULTIPLEXING NETWORKS

RELATED APPLICATION INFORMATION

This application claims priority to provisional application Ser. No. 60/978,277 filed on Oct. 8, 2007, incorporated herein by reference.

BACKGROUND

1. Technical Field

The present invention relates to power stability control in wavelength division multiplexing networks and more particularly to a state-based method and system for controlling power stability in such networks.

2. Description of the Related Art

In recent years, reconfigurable optical add/drop multiplexers (ROADMs) have been widely deployed for their flexibility and their enablement of automated control and dynamic provisioning in wavelength division multiplexing (WDM) networks. Currently, most ROADMs utilize wavelength blockers (WB) or wavelength selective switches (WSS) to switch arbitrary wavelengths at a per-wavelength granularity. WE and WSS can attenuate an incoming wavelength for up to 10 to 15 dB at a step size as low as 0.1 dB. This feature of ROADMs is advantageous, as per channel power control and power equalization can be achieved without additional attenuators.

In a network including cascaded ROADMs and Erbium Doped Fiber Amplifiers (EDFAs), if an optical fiber transmission line is cut or some channels are dropped, the total number of channels in the network may change abruptly and may result in a power excursion to the remaining channels. All ROADM nodes in the network that detect the abnormal power level of a channel using an optical channel monitoring (OCM) module gradually adjust their attenuation for that channel so as to maintain its power level within a preset range. Usually, ROADM nodes adjust their attenuation independently without centralized coordination by means of an optical supervisory channel (OSC).

If the number of cascaded ROADMs is large enough, the independent attenuation could cause strong power ripples and oscillation in the transparent network. In addition, it takes a long time for the network to control the power and reach a stable condition within the present range. During the power control process, WDM signals experience frequent power variation that induces nonlinear effects in optical fiber transmission lines or exceeds the dynamic operable range of optical receivers. Therefore, signal quality is degraded during the transient period.

SUMMARY

In accordance with one or more implementations of the present principles, network nodes employ a finite-state-machine (FSM) based method to adjust their power modification level. For example, the power modification level may correspond to attenuation of signals transmitted through the network. For one or more channels, a node has two states: an active state and an inactive state. In the active state, the node adjusts its modification level when the monitored power level is outside a preset range; while in the inactive state, the node stops adjusting its modification level. The node may remain in the inactive state until power levels are stabilized or until another abnormal power fluctuation occurs.

According to another implementation of the present principles, a node in an inactive state may adjust its modification level at a different degree than in the active state. Similarly, the node may remain in the inactive state until power levels are stabilized or until another abnormal power fluctuation occurs.

In one or more implementations of aspects of the present principles, the transition to the inactive state is made in response to detecting a power change that exceeds a power change threshold. By transitioning nodes into an inactive state, the roles of a number of nodes in the transient power control process may be reduced. As such, the power control process will be expedited, and power ripple and oscillation effects will also be decreased at the same time.

These and other features and advantages will become apparent from the following detailed description of illustrative implementations thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

According to one or more embodiments of the present principles, power stability control may be achieved in several different types of networks employing any one or more of several types of network nodes. For the sake of brevity, illustrative embodiments discussed below are described with respect to a wavelength division multiplexing (WDM) network utilizing cascaded reconfigurable optical add/drop multiplexer (ROADM) nodes that attenuate signals transmitted through the network. However, it should be understood that the present principles may be applied to any type of network in which similar power fluctuations and effects occur and in which nodes modify power levels, including, for example, networks employing nodes that amplify power levels.

Figure 1A:
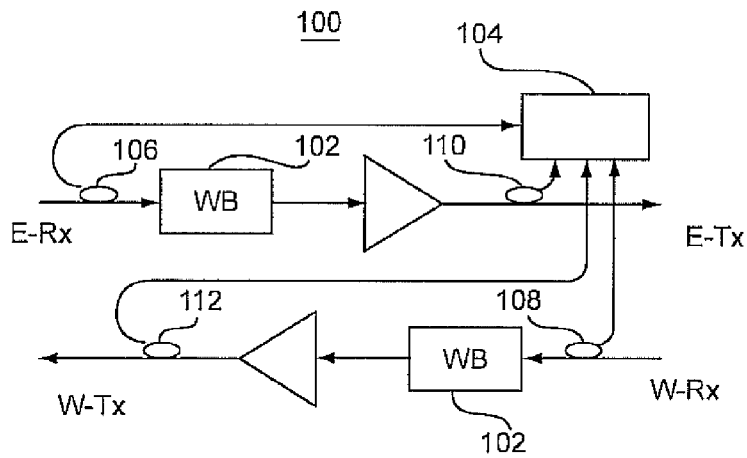
FIG. 1A is a block diagram illustrating an exemplary ROADM node.

Referring now in detail to the figures in which like numerals represent the same or similar elements and initially to FIG. 1A, illustrating an exemplary representation of a bidirectional ROADM node. A bidirectional ROADM node 100, as shown in FIG. 1A, may include a pair of wavelength blockers (WBs) 102 or wavelength selective switches (WSS) (not shown) and an optical channel monitoring (OCM) module 104. For illustrative purposes, wavelength blockers are utilized as power attenuators.

The OCM 104 may be adapted to monitor the per-channel optical power at all input ports (106, 108) and output ports (110, 112) of the ROADM periodically. However, it should be understood that the OCM 104 may be configured to monitor per-channel optical power at fewer than all ports, such as at input ports or at output ports only, or a sub-combination of the two types of ports.

Figure 1B:
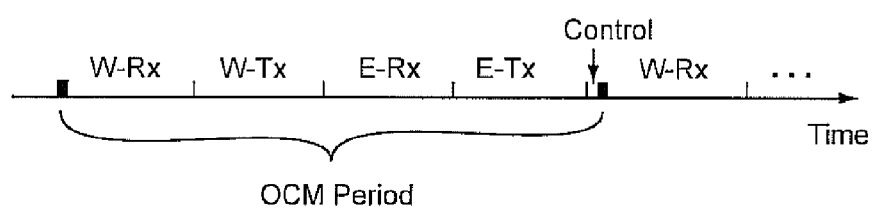
FIG. 1B is a plot depicting an OCM period.
Figure 2:
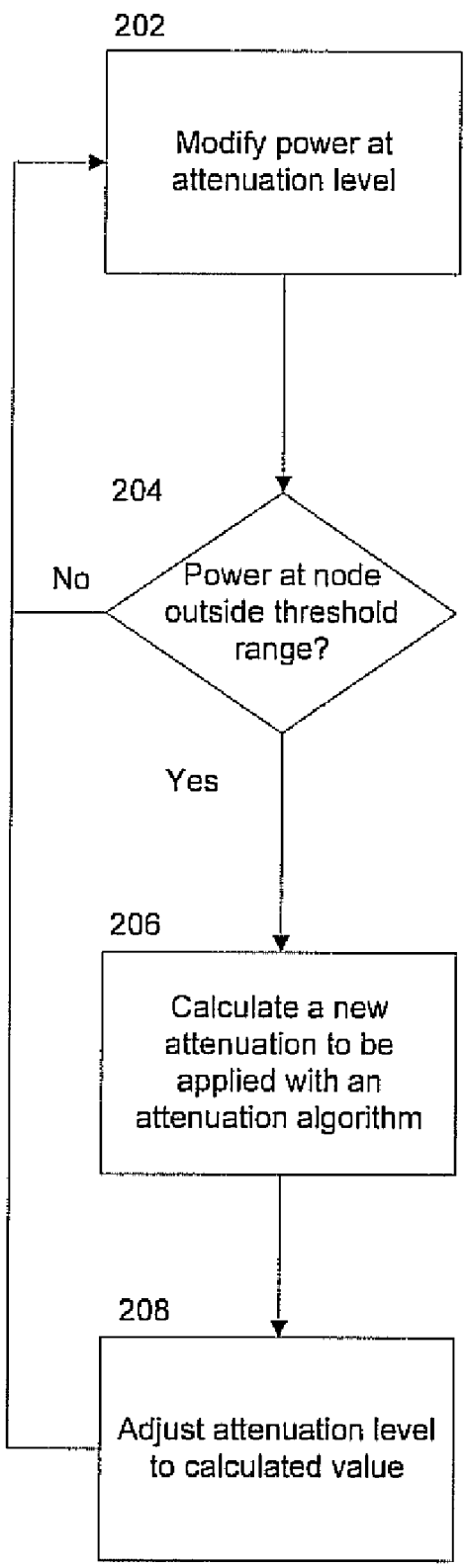
FIG. 2 is a flow diagram depicting an exemplary method for adjusting a power attenuation level at a node.

As shown in FIG. 1B, the OCM 104 may monitor the power of one or more channels at every port in a serial manner, and may communicate the monitored results to a ROADM management system (not shown). With reference to FIG. 2, for example, an initial attenuation may be applied to all channels in step 202. If the monitored output power of a channel is abnormal, determined at step 204, the ROADM management system may control the power of the channel by employing two steps: 1) calculating (206) a new attenuation to be applied to that channel with an attenuation method, and 2) adjusting (208) the attenuation of a WB/WSS to the calculated value so as to bring the output power into an acceptable range. Thereafter the power is attenuated at the new attenuation level in step 202 and the process is repeated as necessary. It should be understood that although the process has been described with respect to attenuation of a signal, the same principles may be also applied, for example, to amplification of the power at the node.

The process of monitor and control of the ROADM may continue in a cyclic manner until the output power of the ROADM is within the preset range. With reference to FIG. 1B, a ROADM node may control its output power once every OCM period. For example, the OCM period may correspond to the time utilized to receive and transmit signals in both directions.

The amount of attenuation adjustment during an OCM period may be referred to as an attenuation step, and the attenuation step size may be determined by a control method embedded in the ROADM. Generally, the transient time, during which a ROADM node completes modifying the abnormal output power to bring it within a normal range, is dependent on the size of the attenuation steps. For example, with a small step size, a ROADM may need many OCM periods to complete the power fluctuation control process; while with a large step size, power fluctuation control may be achieved within a few OCM periods. However, as described more fully below, the step size should be carefully chosen, as a large step size may prolong power fluctuation control due to an attenuation accumulation effect in a cascaded network of ROADM nodes.

When all ROADM nodes in the network are in an active state, the output power of the ROADM node may be compared to a power threshold to determine if an ROADM node should adjust its attenuation. If a positive power excursion over the threshold is induced, for example, as a result of an optical switching operation or a network failure in the front end of the network, every ROADM node detecting the abnormal power level may increase its attenuation for one step in each OCM cycle.

Figure 3:
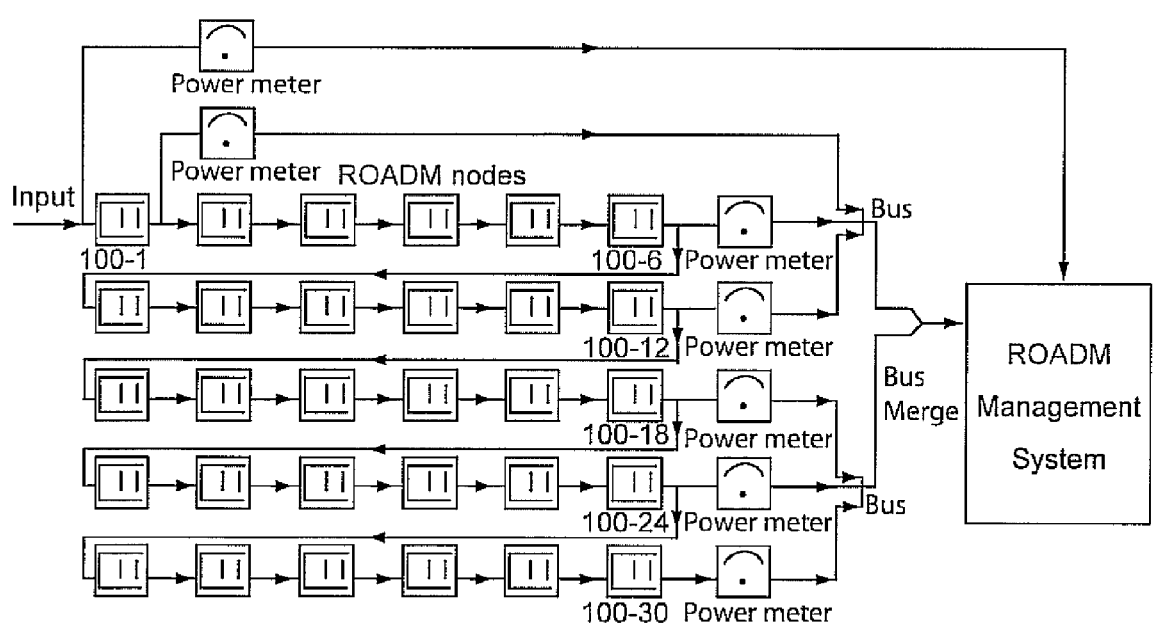
FIG. 3 is a block diagram of an exemplary configuration of cascaded ROADM nodes.

With reference to FIG. 3, an exemplary WDM network with 30 cascaded ROADM nodes (100) perpetually in an active state that may increase attenuation of input signals in response to abnormal power levels is illustrated. The input power, as well as the output power of nodes 100-1, 100-6, 100-12, 100-18, 100-24 and 100-30, may be monitored and recorded. Upon an optical switching operation or a network failure in the front end of the network, the input power of the network may become abnormal due to the transient effects. Consequently, ROADM nodes in the network may detect abnormal output power at their output ports. Based on the control method 200 described in FIG. 2, ROADM nodes that detect abnormal output power adjust their attenuation steps in an effort to control their output power and bring it within the normal range.

Figure 4:
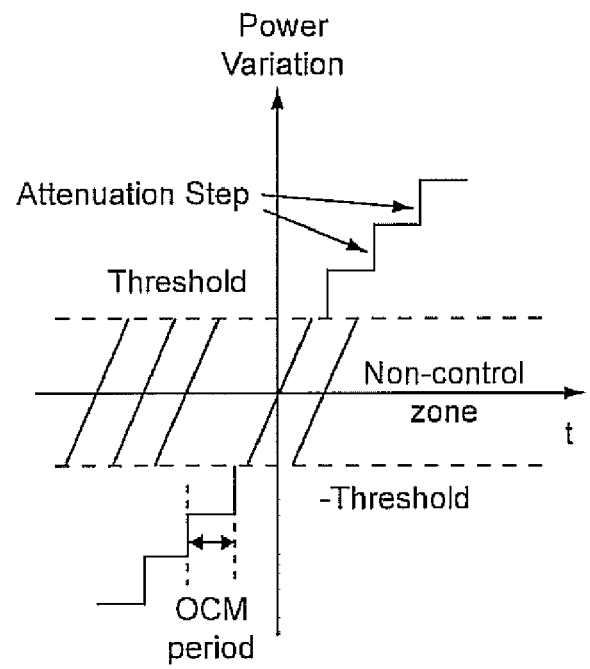
FIG. 4 is a plot illustrating an aspect of an exemplary process for responding to a power excursion outside a threshold range.

Referring now to FIG. 4, the manner in which a ROADM node in an active state may attenuate the power of a signal in response to detecting an abnormal power level is illustrated. As shown in FIG. 4, a power threshold may be preset in a ROADM node to form a non-control zone (NCZ) for each channel. It should be noted that in existing algorithms, every ROADM node independently adjusts its attenuation based on its monitored optical power without coordination with other ROADM nodes through an optical supervisory channel.

If the monitored power of a channel is within the NCZ of FIG. 4, which indicates the power is within an acceptable range, the attenuation to that channel remains unchanged. However, if the monitored power is higher than the upper threshold, its attenuation is increased by a step to reduce the output power. Similarly, if the monitored power is lower than the lower threshold, the attenuation is reduced by a step to increase the output power. This process may be repeated in every OCM period in the ROADM until the output power of that channel is within the NCZ.

In a network with multiple, independent ROADM nodes that are all perpetually in an active state, when the input power fluctuates, all ROADM nodes that detect the power deviation adjust their attenuation in one direction. This may result in over-adjustment, which causes power ripples and oscillation in the network that prolongs the transient time.

Figure 5:
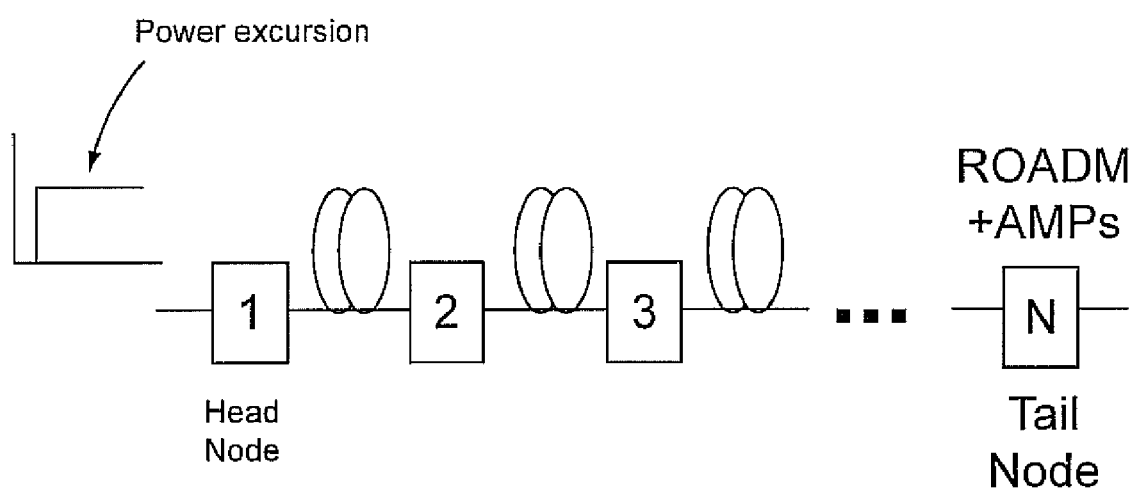
FIG. 5 is a block diagram of another exemplary configuration of cascaded ROADM nodes.

For example, with reference to FIG. 5, illustrating a simplified configuration of a transparent network of cascaded ROADM nodes 1, 2, 3, and with reference to FIG. 6, depicting attenuation performed by the nodes over time, the output power of the ROADMs in the network change for different amounts after each cycle. For example, FIG. 5A demonstrates the output power of the first three nodes in the network. The nodes near the head node, e.g., node 1, at which the power excursion first occurs, have a slower output power change than those close to the tail node, e.g., nodes 2 and 3, due to an attenuation accumulation effect in the network.

Figure 6C:
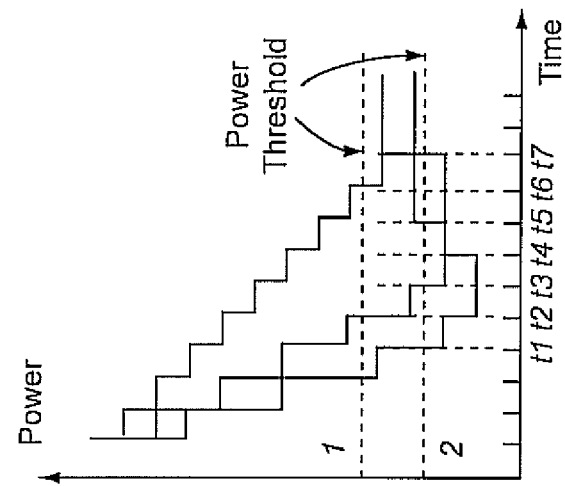
FIG. 6A-6C are plots demonstrating power levels output by nodes in an active state to respond to a power excursion outside a threshold range.
Figure 6B:
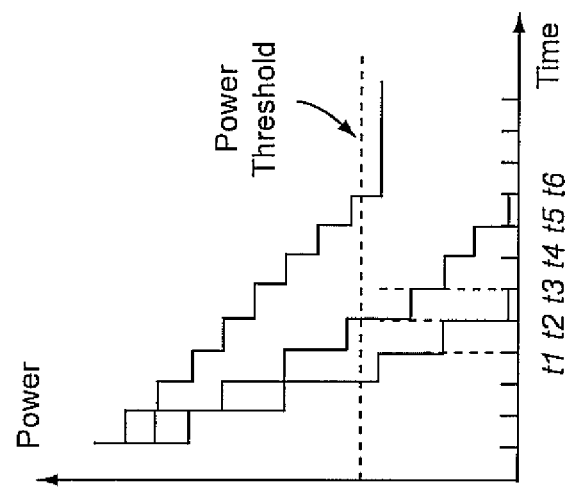

With reference to FIGS. 6B and 6C, the attenuation accumulation effect at nodes near the tail of the network may result in strong power ripples and oscillation. As all ROADMs increase attenuation, the output power of a node, e.g., node 3, near the tail node will become normal first at time t1 and will stop attenuation adjustment, as shown in FIG. 6B. At this time, the output powers of other nodes are still above the preset threshold. Thus, they will continue to increase attenuation. As a result, the node 3's output power continues to decrease at the step size of its preceding node at time t1 and t2. As time passes, the preceding node 2 reaches the NCZ, between power thresholds 1 and 2, by time t3, and stops attenuation. However, although nodes 2 and 3 have stopped attenuation adjustment, their output power will not become stable because node 1 continues to increase attenuation, as its output power is still above the threshold.

Once the output power of a ROADM is monitored to be below the negative threshold 2, that ROADM decreases its attenuation in an attempt to maintain its output power within the threshold range. As shown in FIG. 6C, when node 3 detects that its output power is below the negative threshold, it decreases attenuation to compensate for its low output power at time t2. However, due to the attenuation of node 1, node 3's output continues to drop for one step at t2 and then remains unchanged until t4. At t4, node 2's output power is also below negative threshold, Thus, both nodes 2 and 3 decrease their attenuation at time t4. As a result, node 3's output power increases by one attenuation step.

This process continues in the next cycle, and the output power of node 3 becomes normal at time t5. After node 1's output power becomes normal at time t6, node 2 adjusts its attenuation again at t7 and its power becomes normal. At that time, although node 3 does not adjust its attenuation, its output power also increases by one step.

In the above-recited process, in which all ROADM nodes are always in an active state, ROADM nodes first increase and then decrease attenuation to control their output power level. This process continues until the head node's output power reaches a normal level, i.e., is within the NCZ between thresholds 1 and 2. Thus, during the process of attenuation adjustment at each node, as discussed above, power ripples and oscillation are induced in the network as a result of the attenuation accumulation effect.

Furthermore, due to the attenuation accumulation effect, small attenuation step sizes are used to control the power, as extremely strong power ripples may occur at nodes close to the tail end of the network if large step sizes were utilized. In addition to strong power ripples, use of large attenuation steps may cause the network to suffer severe over-adjustment and high frequency oscillation, thereby causing a relatively long transient time. With small attenuation step sizes, however, the head node would also utilize a relatively long transient time, for example, many OCM periods, to control its output power and reach a stable condition. Thus, applying either large or small step sizes in a network in which all ROADM nodes are always in an active state results in relatively long transient times prior to stabilizing the power output of ROADM nodes within their normal power range, or, equivalently, their NCZ, in addition to power ripples and oscillation.

Power ripples and oscillation and transient time can be decreased if the involvement of nodes close to the tail of the network in the power fluctuation control process is reduced. This may be achieved by, for example, permitting ROADM nodes to determine their positions relative to the input power fluctuation via an optical supervisory channel (OSC). A network management system may communicate with the network elements, such as ROADM nodes and amplifiers, using the OSC. Upon determining the location of the input power fluctuation, the attenuation of the first node may be adjusted to fully compensate the input power fluctuation within a single OCM period. At the same time, all the other nodes need not adjust their attenuation, thereby reducing power ripples and oscillation and decreasing the transition time.

However, in a complex network, it may be inefficient to coordinate the attenuation adjustment with OSC. Due to technical limitations, there may be a significant delay before the ROADM nodes could collect their position information via OSC. Because all ROADM nodes do not control the power fluctuation, data may be lost during that period.

In accordance with an aspect of the present principles, which ROADM nodes are close to the tail of the network may be determined by examining the power change that is monitored at the node. For example, with reference to FIG. 6A, the power change magnitude at node 3 over one period is much larger than the power change magnitude at node 1 over the same period, indicating that node 1 is near the source of the power fluctuation and node 3 is relatively far from the power fluctuation source, near the tail of the network. Thus, power ripples and oscillation as well as transient time, may be reduced by permitting nodes near the power fluctuation source, e.g., node 1, to adjust its attenuation while nodes near the tail of the network, e.g., node 3, do not adjust their or adjust their attenuation to a lesser degree.

According to one implementation of the present principles, transient time and power ripples and oscillation may be significantly reduced by applying a finite-state-machine (FSM) based method. The FSM method may utilize both power threshold and node state to determine when and how an ROADM should respond to and control the transient power excursion. In the method, a ROADM node has two states: the active state and inactive state. In an active state, a ROADM node monitors the output power and adjusts the attenuation if the monitored power level is abnormal in accordance with an attenuation method.

While in an inactive state, the ROADM node does not adjust its attenuation, even if the monitored power is abnormal. Thus, the attenuation level may be fixed while in the inactive state. However, it should be understood that it is contemplated that, in accordance with another implementation of the present principles, the attenuation adjustment may be made at a lesser degree than in the active state, as more fully described below with respect to FIG. 9.

When transitioning to the inactive state, the attenuation level may be restored to the value of the most recent stable condition. For example, the attenuation level may be restored to the level at which an input signal was attenuated just prior to the detection of an abnormal power level.

Furthermore, the active and inactive states may be applied to individual channels. In the FSM method, the two states may be assigned to a ROADM node on a per-wavelength or per-channel basis, i.e., a ROADM node can be in active state for one wavelength or channel J and simultaneously at inactive state for another wavelength or channel K. When a ROADM is active for a wavelength or a channel J, for example, it adjusts the attenuation to that wavelength or channel based on the monitored power level; however, when it is inactive for a wavelength or a channel K, for example, it may stop its attenuation adjustment or keep its attenuation adjustment unchanged as described above. The states of a ROADM on different wavelengths or channels may be independent and may have no influence on each other. Once transition conditions for a wavelength or channel are met, the ROADM node may transition to another state for that wavelength or channel only.

According to another aspect of the present principles, the transition from the inactive state to the active state may occur when the power control process has finished or another power excursion is induced in the network, as described more fully below. The ROADM node may communicate with its adjacent upstream node to determine whether either or both of these two conditions are met.

Figure 7:
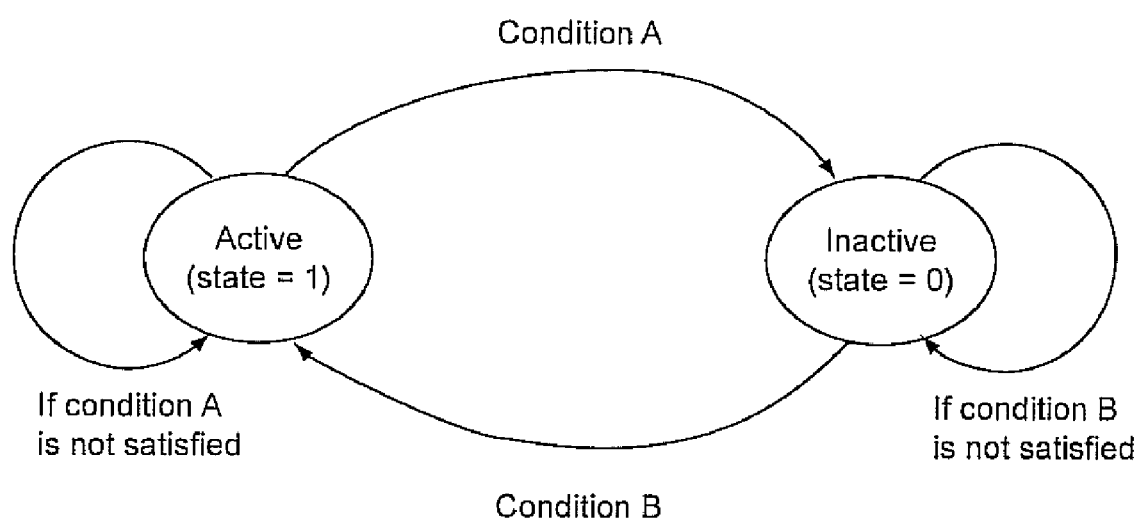
FIG. 7 is a block/flow diagram illustrating exemplary node states for power fluctuation control in one implementation of the present principles.

With reference to FIG. 7, which nodes are near the tail of the network may be determined based on their output fluctuation change, or, equivalently, the power change magnitude discussed above. If a node is at or near the tail side of the network, it should transition to an inactive state and should not adjust the attenuation level to control the power. Otherwise, its adjustment may contribute to power ripples and oscillation and may increase the transient time.

TABLE 1

| | |
|---|---|
| Condition A | The change of the output power is greater than Threshold_1 during two consecutive periods |
| Condition B | 1. Convergence process has finished: (1) Power change is less than Threshold_2 within k consecutive periods; and (2) The adjacent upstream node's output power change is also less than the Threshold_2 during k consecutive periods. 2. Additional input power change occurs: (1) Local OCM detects power change greater than Threshold_3; and (2) The adjacent upstream node does not experience this within two consecutive periods. |

The conditions for transitioning between two states in accordance with one implementation are shown in Table 1. Initially all ROADM nodes in a network may be in an active state for all wavelengths or channels. When power excursion is induced by a fiber cut or an add/drop operation, for example, and the excursion level of a channel exceeds a certain threshold, all ROADMs that monitor the abnormal power level may adjust attenuation for that channel independently.

For example, if the input power increases and all ROADM nodes detect a power fluctuation outside a threshold range, e.g., a NCZ, the ROADM nodes may begin to increase their attenuation by one step. After an OCM period, during which the ROADM nodes adjust their attenuation once, the output power of node number i in the network decreases by i* step. Because there is usually random power fluctuation within a small range in the network, the output power change of the ROADM nodes becomes i* step+P(t). Due to the attenuation accumulation effect, after each cycle the nodes may detect different levels of output power change.

With reference to Table 1, a transition Threshold_1 is set for the active state. If the monitored output power change of a wavelength or channel exceeds Threshold_1 during two consecutive OCM periods, Condition A, the ROADM node transitions to an inactive state, as it should be relatively close to the tail end of the network. Otherwise it remains in an active state. Furthermore, it should be understood that if Condition A is met, the node transitions to the inactive state even if its output power is outside the NCZ threshold range. As discussed above, the attenuation accumulation effect resulting from attenuation adjustment of upstream nodes acts to bring the power output of the node towards the threshold range within a lower transient time and with reduced power ripples and oscillations. Thus, the transition may be made to reduce the time in which the power level at the node is stabilized within the threshold range.

Once a node is in an inactive state, the node may restore its attenuation level to that of the previous stable condition. In the inactive state, the node may continue to monitor the output power while keeping the attenuation constant at the level of the last stable condition, Thus, the node may stop further attenuation until Condition B is met.

While a node is in an inactive state, the node may communicate with its adjacent upstream node via OSC to determine when it should transition back to active state. There are at least two conditions in which an inactive node should transition to an active state. The first condition, Condition B(1) in Table 1, may indicate that the transient process has ended and the network is stable again. In this case, the output power of an inactive node and its upstream node may be within, for example, the non-control zone for k consecutive periods. If Condition B(1) is satisfied with respect to inactive nodes, the inactive nodes should transition to active state so as to be ready to respond to another power fluctuation.

In the second condition, Condition B(2) in Table 1, for example, another power fluctuation may occur from a new source somewhere in the network during the transient process. Affected nodes relatively near the new source of the power fluctuation should transition to active state to control the abnormal optical power level. In this case, if the output power change detected at such an affected node exceeds a threshold level, Threshold_3, and its adjacent upstream node does not experience the same power change at some point within two consecutive OCM periods, then the node detecting the power change with a magnitude above Threshold_3 transitions to active state to manage the new fluctuation.

Thus, according to one implementation of the present principles discussed above, transient time and power ripples and oscillation over a network may be reduced by applying the FSM method described above, as nodes most likely to contribute to such effects in a detrimental way are in an inactive state during the power control process.

According to another aspect of the present principles, the attenuation step size for nodes in the active state may be increased gradually to expedite the transient control process. The over-adjustment occurring in a network in which all nodes are perpetually in an active state will not be as severe in network employing an FSM method if the attenuation step size is increased, as a number of nodes would be in an inactive state and, in the implementation discussed above, would not adjust their attenuation. In accordance with another aspect of the present principles, for ROADM nodes still in an active state, the attenuation step size may be increased gradually until a preset maximum value is reached.

In either case, with a large step size, more ROADM nodes would be transitioned into an inactive state over time. Thus, it is possible that at some point only the head node nearest the source of the power fluctuation adjusts its attenuation while all other downstream nodes are in an inactive state. This may be the most preferable situation in certain circumstances to achieve a low incidence of power ripples and fast power control with a low transient time in ROADM networks. Implementations of the present principles in which the attenuation step size is increased are discussed in more detail below with respect to simulations conducted to compare a network employing a FSM method with a network in which all nodes are always in an active state.

TABLE 2

| | |
|---|---|
| Condition A | Power change at the node exceeds a first power change threshold over consecutive first time periods. |
| Condition B | 1. (1) Power change at node is less than second power change threshold over consecutive second time periods; and (2) Adjacent node's power change is also less than second power change threshold consecutive second time periods.<br>2. (1) Power change at node is greater than third power change threshold; and (2) Adjacent node's power change is less than third power change threshold over consecutive third time periods. |

Figure 8:
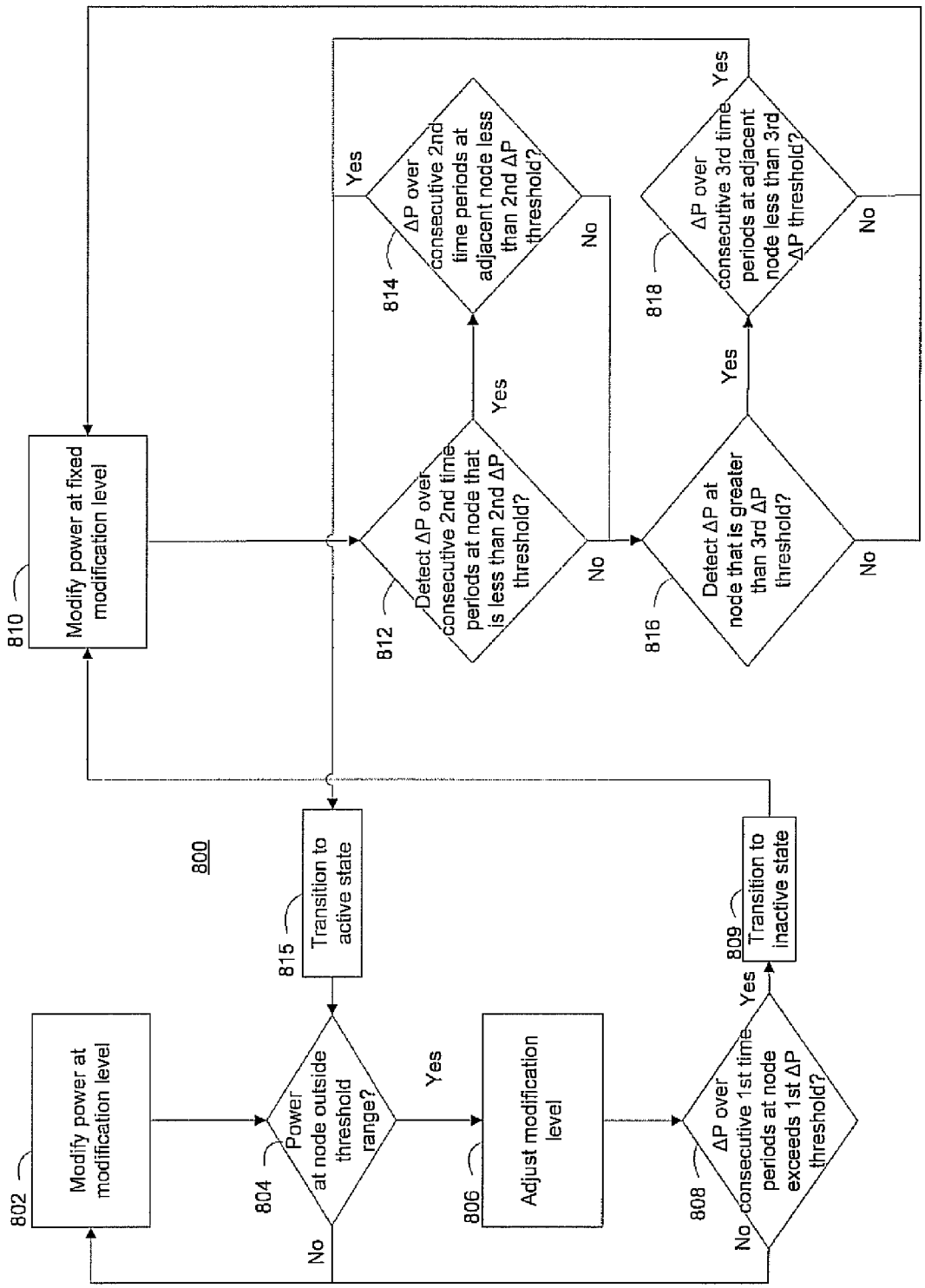
FIG. 8 is a flow diagram of one method implementation of the present principles in which power changes at a node are examined to determine whether to transition between active and inactive states to control power fluctuations in a network of nodes.
Figure 9:
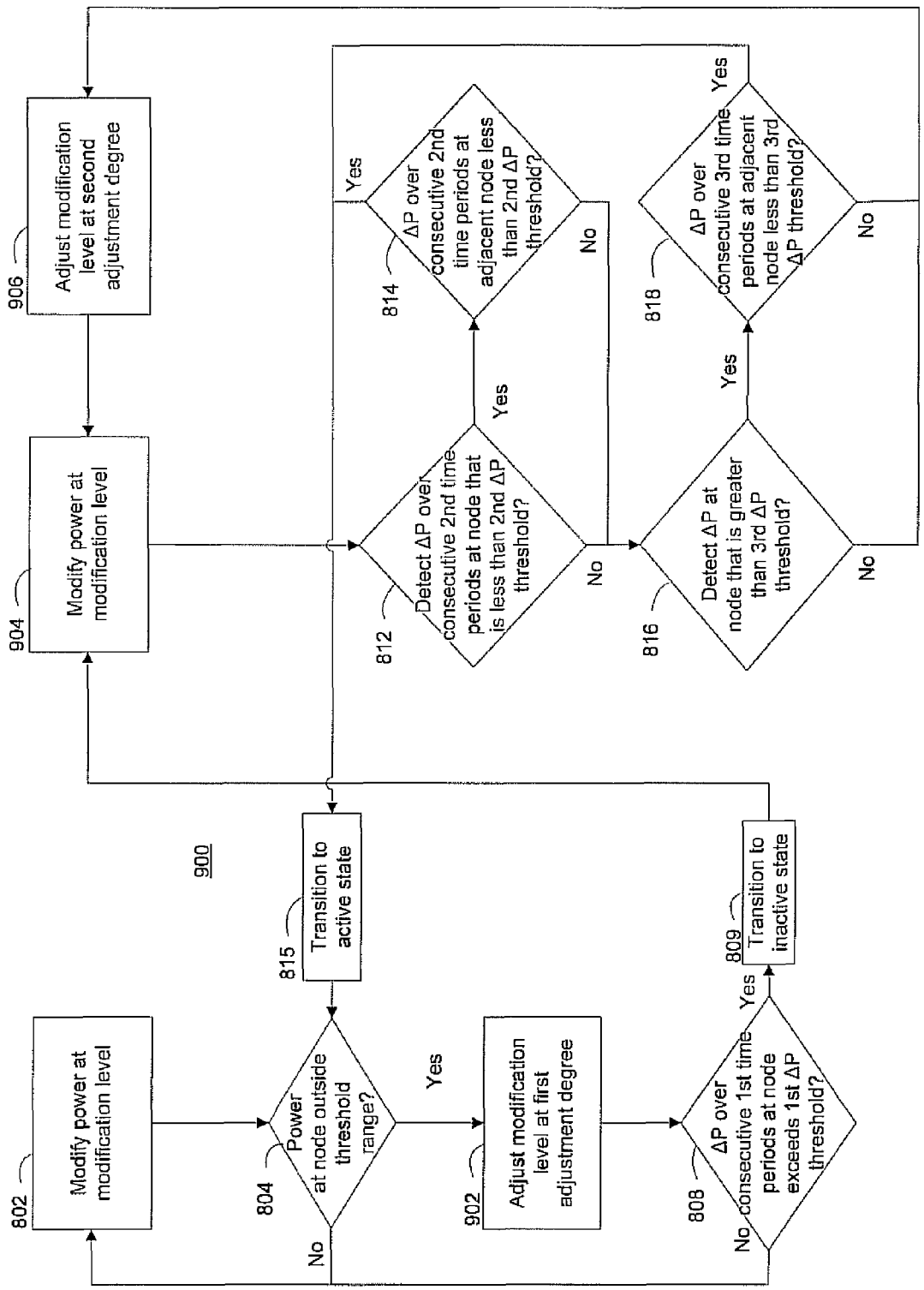
FIG. 9 is a flow diagram of another method implementation of the present principles in which power changes at a node are examined to determine whether to transition between active and inactive states to control power fluctuations in a network of nodes.

With reference to FIG. 7 and Table 2, conditions for transitioning between active and inactive states for one or more implementations of the present principles to control power fluctuations in a network are described. Two of such implementations are illustrated in FIGS. 8 and 9, as method 800 and 900, respectively. Although steps in FIG. 8, for example steps 812-818, and also, FIG. 9, are depicted in a specific order, it is contemplated that the order of one or more of the steps in methods 800 and 900 may be varied in a manner consistent with the conditions set forth in Table 2 as understood by one of ordinary skill in the art. For example, one or more of steps 812-818 may be performed simultaneously and/or in a different order. For example, step 814 may be performed before step 812.

With reference to FIG. 8, a method implementation 800 for controlling power fluctuations in a network in accordance with aspects of the present principles is illustrated. The method 800 corresponds to method steps performed at a node in a network including a plurality of nodes. Such a node may include, inter alia, a ROADM node, as discussed above, an amplifier node, or any other node that modifies the power level of a signal. The left side of FIG. 8, steps 802-808, corresponds to steps performed at the node while in an active state. In contrast, the right side of FIG. 8, steps 810-818, corresponds to steps performed at the node while in an inactive state.

The method may begin by modifying in step 802 a power input of a node at a modification level to maintain a power output of the node within a threshold range. As described above, the modification of a power input may include attenuation of a signal received at an ROADM node at an attenuation level, which may be performed to maintain the power level of a signal within a non-control zone threshold range. It should be understood that a threshold range may also correspond to a single threshold value at which a power level is maintained. Moreover, it is also contemplated in another implementation of method 800, that the modification may comprise amplifying a power input of a node at an amplification level to maintain a power output of the node within a threshold range.

In addition, although step 802 is depicted as a step, it should be understood that step 802 may be performed continuously throughout the process, during which the modification level may be adjusted.

With reference to step 804, periodically, the power level at a node is monitored to determine whether the power level at the node is outside the threshold range. For example, as described above, the power level at any input or output port of the node for one or more channels or wavelengths may be monitored to determine whether the power level at the node is outside a threshold range. Although in an implementation discussed above, the output power of a node for a channel or wavelength is compared to the threshold range, it is contemplated that one or more input ports of the node may be monitored in lieu of or in addition to one or more output ports of the node to determine whether the power level of a signal at the node is outside a threshold range.

In response to determining, in step 804, that a power level at the node is outside a threshold range, for example, an NCZ, the modification level is adjusted in step 806. As stated above, a power level outside the threshold range indicates that the power level is abnormal. FIG. 2 is an exemplary illustration of one method for adjusting a modification level. The adjustment of the modification level may reduce the difference between a power level at the node and a power output level within the threshold range. For example, as discussed above with respect to FIG. 6C, the attenuation adjustment of the nodes, up to time t1, for example, may reduce the difference between the power output of the node and the threshold range, e.g., the NCZ in FIG. 6A.

Furthermore, the modification level may be adjusted in step 806 in step sizes that may be either constant or varying. For example, as described above, the attenuation level may be adjusted according to an attenuation step, which may be constant or which may increase over time to reduce the transient period in the network.

Figure 6A:
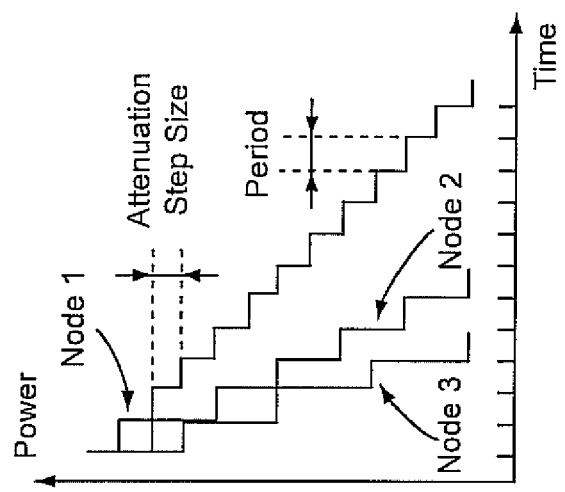

Following adjustment of the modification level, at step 808, it is determined whether the power change, $\Delta P$, during consecutive first time periods at the node is outside a first power change threshold. For example, as discussed above, a power change may correspond to the magnitude of the power change over an OCM period. As illustrated in FIG. 6A, the power change corresponds to the magnitude of the power drop at a time t. Furthermore, the first time period referenced in step 808 may correspond to, for example, an OCM period and the first power change threshold may correspond to, for example, Threshold_1 in Table 1.

It should also be understood that the power change should be distinguished from a power level. For example, the power change is the magnitude of the difference between two power levels. The power change may exceed any power change threshold regardless of whether or not any power levels used to determine the power change are within the threshold range, such as, for example, the NCZ, and regardless of whether the power levels corresponding to the power change are increased or decreased over time.

Returning to step 808 in FIG. 8, if the magnitude of the power change exceeds the power change threshold over consecutive first time periods, then the node transitions, in step 809, to the inactive state. For example, referring again to FIG. 6A, if the magnitude of the power drop at a node over one OCM period exceeds the power change threshold and if the magnitude of the power drop at the node over the next, consecutive OCM period exceeds the power change threshold, then the node transitions to the inactive state. However, it should be understood that although step 808 was explained using two consecutive periods, it is fully contemplated that more than two consecutive periods may be examined to determine whether the node should transition to an inactive state. Moreover, the first time period may correspond to time periods other than an OCM period.

Furthermore, in accordance with an aspect of the present principles, as discussed above, the magnitude of the power change may exceed the power change threshold for consecutive first time periods while the power level at the first node is outside the threshold range. Thus, the power output level at the node may be outside the threshold range during the transition from the active state to the inactive state.

Should the power change at the node not exceed the power change threshold for consecutive first time periods, then step 802 is performed, wherein the power is modified in accordance with the adjusted modification level. Thereafter, the active state steps 802-808 may repeat continually.

In addition, it should be understood that although method 800 was described with step 808 performed after step 806, step 808 may be performed at any point subsequent to step 802, e.g., before step 804 or between steps 804 and 806.

Returning again to step 809 in which the node is transitioned to the inactive state, the method steps in the inactive state may begin at step 810. As discussed above, the transition to the inactive state for nodes relatively close to the tail of the network may be made to reduce the transient time and power ripples and oscillations. More specifically, the transition may be made to reduce the time in which the power level at the node is stabilized within the threshold range.

At step 810, the power at the node is modified at a fixed modification level. Furthermore, the fixed modification level may be equal to a modification level applied while the power output of the node was within the threshold range. For example, as discussed above, when transitioning to the inactive state, an attenuation level may be restored to the value of the most recent stable condition. Additionally, it should also be understood that although step 810 is depicted as a step, the power may be modified continuously while the node is in an inactive state.

After transitioning the node to an inactive state, it is determined, in step 812, whether a power change over consecutive second time periods at the node that is less than a second power change threshold has been detected.

For example, as discussed above with respect to Condition B(1) in Table 1, the second time period may correspond to an OCM period. However, it should be understood that the second time period may correspond to an appropriate time period other than an OCM period. Moreover, consecutive second time periods may, for example, correspond to k consecutive periods, as discussed above.

If it is determined in step 812 that a power change over consecutive second time periods at the node is less than a second power change threshold, then it is determined, in step 814, whether the power change over consecutive second time periods at an adjacent node is less than the second power change threshold. For example, as described above with respect to Condition B(1) in Table 1, the adjacent upstream node's output power change may be examined to determine whether it is less than Threshold_2 within k consecutive periods. Furthermore, it is contemplated that consecutive second time periods described in steps 812 and 814 may correspond to the same time period.

In response to determining that a power change over consecutive second time periods at an adjacent node is less than the second power change threshold, then the node transitions, in step 815, to the active state. As discussed above, a power change below a second power change threshold over consecutive time periods for both the node and an adjacent node may indicate that a stable condition has been reached and the node may return to the active state to respond to a new power fluctuation, if it should arise.

Thereafter, step 804 is performed and the process progresses as described above with respect to the active state. Alternatively, steps 802, 806, or 808 may be performed upon transition to the active state. However, it should be understood that if step 802 should be performed upon transition to the active state or upon a "no" decision at step 804, the modification level may correspond to the most recent modification level in the inactive state. For example, in method 800, the modification level may correspond to the fixed modification level.

Returning to steps 812 and 814, if it is determined that a power change over consecutive second time periods at the node that is less than the second power change threshold has not been detected and/or a power change over consecutive second time periods at an adjacent node is not less than the second power change threshold, then the method proceeds to step 816.

At step 816, it is determined whether a power change at the node that is greater than a third power change threshold has been detected. For example, with respect to Condition B(1) in Table 1, the third power change threshold may correspond to Threshold_3 and it may be determined whether a power change at the node exceeds Threshold_3 within a single OCM period. However, it should be understood that a period other than an OCM period may be used to determine whether the power change at the node exceeds a third threshold.

If it is determined that a power change at the node that is greater than a third power change threshold has been detected, then the method proceeds to step 818, wherein it is determined whether a power change over consecutive third time periods at the adjacent node is less than a third power change threshold. For example, as described above with respect to Condition B(2) in Table 1, an adjacent upstream node's output power change may be examined to determine whether it is less than Threshold_3 within two consecutive periods. However, it should be understood that the third time period may correspond to a time period other than an OCM period. Moreover, it should also be understood that although step 818 was described using two consecutive periods, it is fully contemplated that more than two consecutive periods may examined to determine whether a power change over consecutive third time periods at the adjacent node is less than a third power change threshold.

In response to determining that the power change of an adjacent node over consecutive third time periods is less than the third power change threshold, the node transitions to the active state in step 815 as described with regard to steps 812 and 814. However, unlike the transition in response to steps 812 and 814, the transition in response to steps 816 and 818 may be made to permit the node to respond to a new, abnormal power fluctuation, in the active state. For example, as described above, if a power change detected at the node is above threshold_3 and a power change above threshold_3 is not detected at an adjacent, upstream node at any point within two consecutive OCM periods of the detection at the first node, then the power change at the first node may be an indication that the first node is near the source of the new power fluctuation. As such, the first node should be transitioned to the active state to respond to the abnormal fluctuation and stabilize its power output level within the threshold range.

Referring again to steps 816 and 818, if a power change at the node that is greater than the third power change threshold is not detected and/or it is determined that the power change over consecutive third time periods at an adjacent is not less than the third power change threshold, then the power at the node is modified at the fixed modification level and the steps 810-818 are repeated as described above until the node is transitioned to the active state.

It should be understood that while a first node is in an inactive state, adjustment to the modification level at one or more adjacent upstream nodes in an active state may adjust the power level at the first node to a level within the threshold range due to the accumulation effect described at length above, for example, with respect to FIGS. 6A-6C.

Furthermore, it is also contemplated that the method 800 may be performed at a node that receives and transmits signals on a plurality of independent channels or wavelengths such that the method steps may be separately performed with respect to each channel or wavelength to control the power level of signals transmitted on the channels or wavelengths. In addition, a node may be simultaneously in an active state for one channel and in an inactive state for another channel, as described more fully above.

With reference to FIG. 9, another method implementation 900 in accordance with aspects of the present principles is depicted. The method is the same as method 800 except that step 902 replaces step 806, step 904 replaces step 810 and step 906 is added for the inactive state.

With reference to step 902, in response to determining that the power at the node is outside the threshold range, the modification level may be adjusted in accordance with a first adjustment degree. For example, an adjustment degree may correspond to an attenuation step described above.

Furthermore, similar to step 802 described above, in step 904, the modification of the power at the node may be performed continuously throughout the process, during which the modification level may be adjusted in response to an adjustment made in step 906. In step 906, the modification level is adjusted at a second adjustment degree. The magnitude of the second adjustment degree may be less than the magnitude of the first adjustment degree. For example, the second adjustment degree may correspond to an attenuation step size that is smaller than the first adjustment degree. Because the second adjustment degree is less than the adjustment degree applied in the active state, power ripple and oscillation effects may be decreased to reduce the time in which the power output of the node is stabilized within the threshold range.

Step 906 is performed and repeated through each cycle as long as the result of at least one of the determination steps 812 and 814 is "no" and at least one of the determination steps 816 and 818 is "no." Similar to the inactive state in method 800, the steps 904, 812-81B, and 906 are repeated until the node is transitioned to the active state. Additionally, it should be understood that, as described above with respect to step 809, the power output of the node may be outside the threshold range during the transition.

Figure 10:
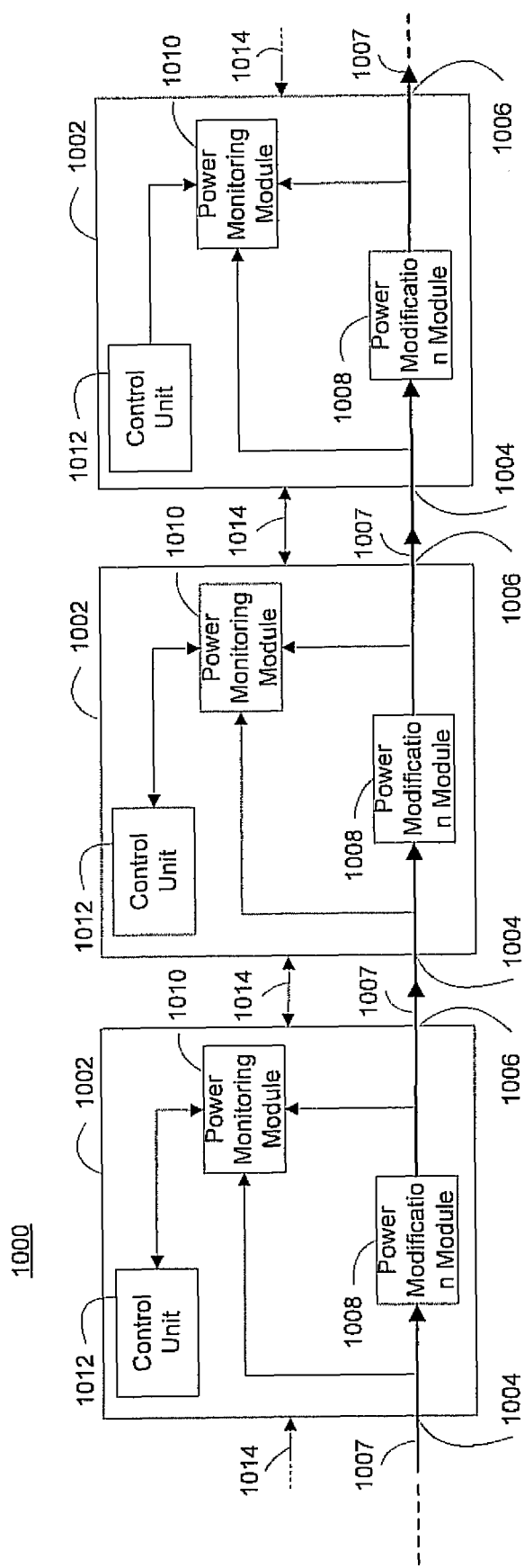
FIG. 10 is a block diagram of one system implementation that applies aspects of the present principles to control power fluctuations in a network.

With reference to FIG. 10, a system implementation 1000 for controlling power fluctuations in a network according to aspects of the present principles is depicted. The system may include a plurality of nodes 1002 that are configured to perform method implementations of the present principles, such as, for example, methods 800 and 900. In one exemplary implementation, the nodes may include cascaded, ROADM nodes in a wavelength division multiplexing network, as described above. Additionally, the nodes may include cascaded amplifiers, also discussed above.

Each node in the system 1000 includes at least one input port 1004 and at least one output port 1006 for the receipt and transmission of signals over one or more wavelengths or channels. The signals transmitted between nodes over transmission lines 1007, such as, for example, optical fiber lines. In addition, each node may further include a power modification module 1008 configured to modify the power of at least one signal received at an input port 1004 at a modification level to maintain the power of the signal output by the node within a threshold range. For example, the power modification module 1008 may be configured to perform steps 802, 810, and 904, as discussed above. Moreover, the power modification module 1008 may, for example, be comprised of a WB or WSS, as discussed above.

The system 1010 may also include a power monitoring module 1010 that is configured to monitor the power of signals received and/or transmitted through node ports. For example, the power monitoring module 1010 may be an optical channel monitoring module, as described above. Although each node 1002 in system 1000 is illustrated as including their own separate power monitoring module 1010, a power monitoring module 1010 may be shared by multiple nodes.

A control unit 1012 configured to control the power modification module 1008 of a node may be included in system 1000. One example of a control unit may include a reconfigured ROAD management system. In accordance with aspects of the present principles, the control unit 1012 may be employed to control the power fluctuations of signals in a network according to the conditions set forth in Table 2. For example, the control unit 1012 may be configured to perform steps 804-809, 812-818, 902 and 906. In addition, the control unit 1012 may utilize the power monitoring module to perform the decision steps depicted in FIGS. 8 and 9.

For example, the power monitoring module 1010 may communicate the power levels at the node to the control unit 1012 so that the control unit 1012 may determine whether the power levels are outside the threshold range and/or whether the power change at the node is greater than or less than power change thresholds over certain time periods. It is further contemplated that the control unit 1012 may control the power modification module 1010 of one or more nodes by adjusting the modification level to reduce transient time and power ripples and oscillations in accordance with aspects of the present principles discussed above. Furthermore, it should be understood that while each node includes their own control unit 1012, a control unit 1012 may control the power modification modules 1010 of multiple nodes.

With regard to determining the power change of one or more signals of an adjacent node, such as, for example, in steps 814 and 818, as discussed above, the control unit 1012 may communicate with the adjacent node via at least one node communication channel 1014. For example, the node communication channel 1014 may be comprised of an optical supervisory channel, as described above. Moreover, although the node communication channel is depicted as being communicated through a line separate from transmission line 1007, it should be understood that the node communication channel may be transmitted through the transmission line 1007.

It should also be understood that a node 1002 may receive and transmit signals on a plurality of independent channels or wavelengths such that the power level of signals transmitted on the channels or wavelengths may be separately and independently modified and controlled, as discussed above. In addition, a node may be simultaneously in an active state for one channel and in an inactive state for another channel, as described more fully above.

Figure 11:
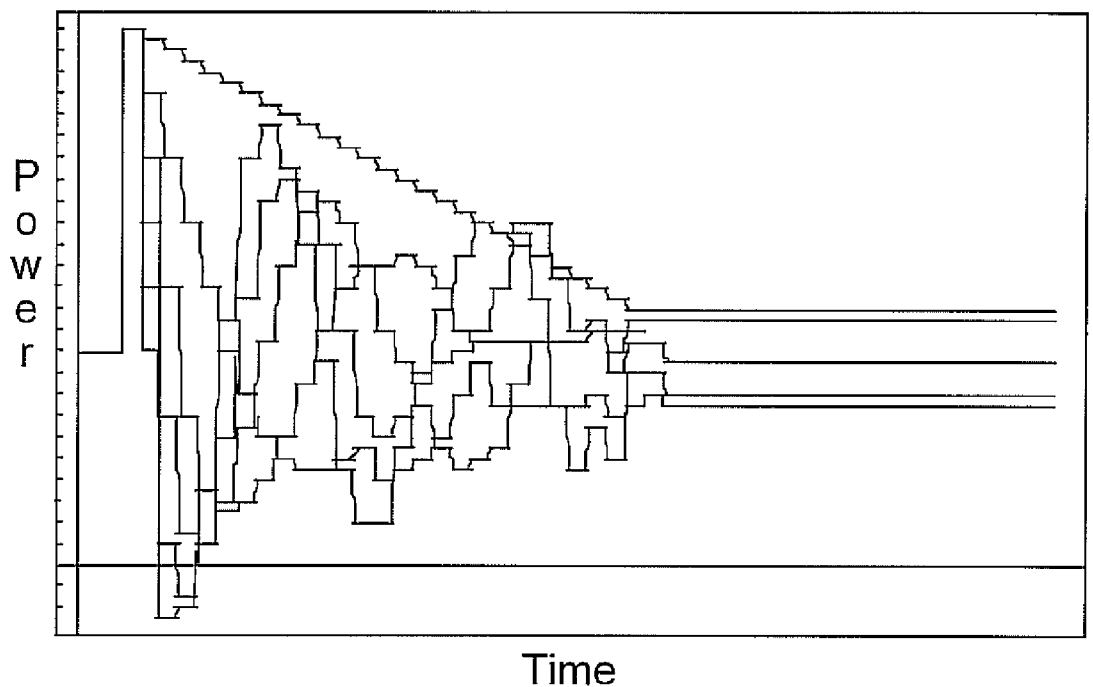
FIG. 11 is a simulation plot illustrating the power output levels of a network of nodes that are all perpetually in an active state to control power fluctuations.
Figure 12:
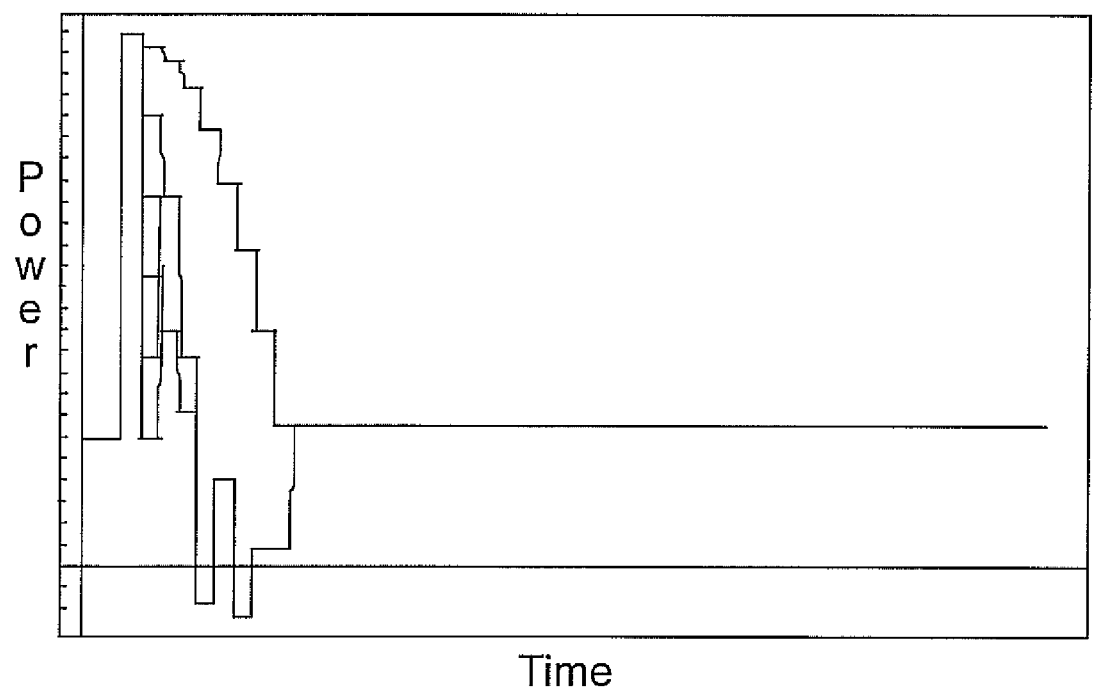
FIG. 12 is a simulation plot illustrating the power output levels of nodes that apply a FSM method in accordance with one implementation of the present principles in which an attenuation step size is increased by 0.1 dB every two OCM periods.
Figure 13:
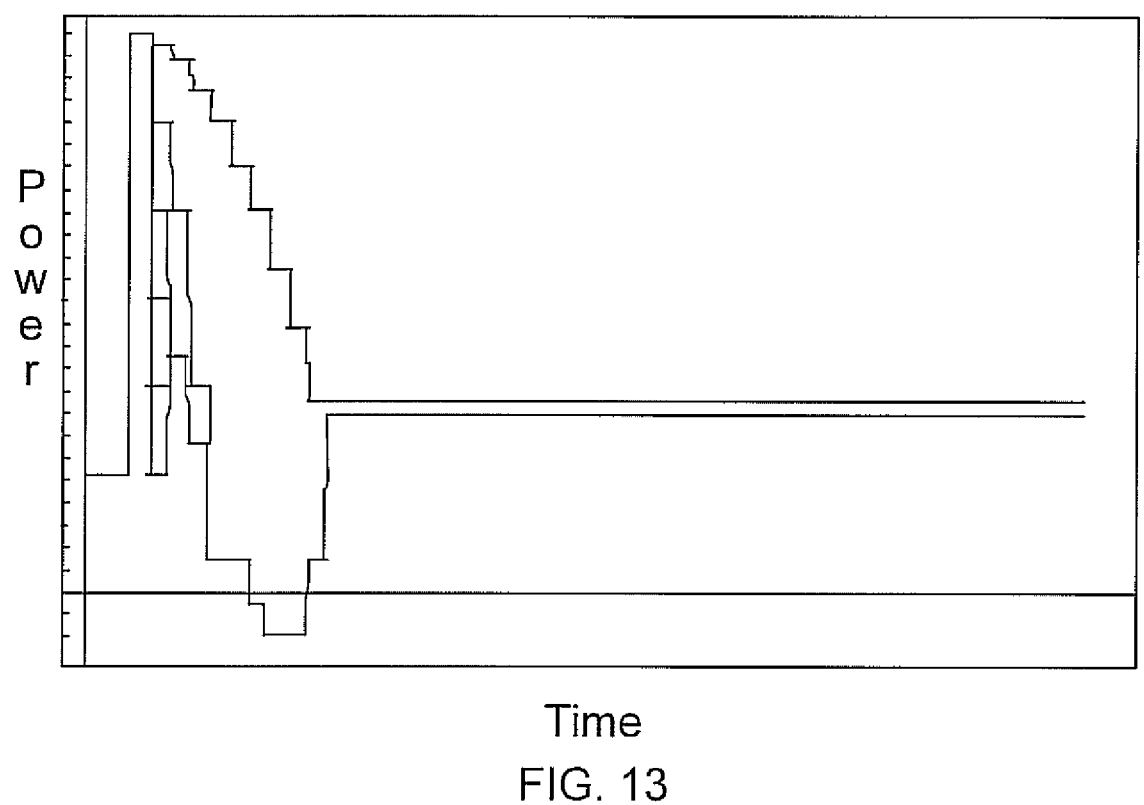
FIG. 13 is a simulation plot illustrating the power out levels of nodes that apply a FSM method in accordance with one implementation of the present principles in which an attenuation step size is increased by 0.1 dB every OCM period.

With reference to FIGS. 11-13, plots corresponding to simulations of power control processes are depicted to illustrate advantages of a network utilizing an FSM method in accordance with one implementation the present principles over a network in which all nodes are perpetually in an active state. The simulation evaluates system behavior and response during the power control process. A linear network including 30 ROADMs are examined at different power excursion levels by applying an FSM method in accordance with an implementation of the present principles and a method in which all nodes are always in an active state.

Referring now to FIG. 11, a plot depicting power levels of ROADM nodes during a simulated optimized power control process in which all nodes in the network are always in an active state is provided. In the simulation, the input power fluctuates from 2 dBm to 5 dBm. Responsive to the input power fluctuation, all 30 ROADM nodes begin to adjust their attenuation at a fixed step size of 0.1 dB. In the plot in FIG. 11, the power ripples range from 4.1 dBm to −0.5 dBm, the transient time is 280 seconds (28 OCM periods), and there is significant power oscillation during the process. Thus, in a network in which all nodes are perpetually in an active state, it may take the network several hundreds of seconds to attain a stable condition, during which, the network suffers strong power ripples and oscillation.

With reference to FIGS. 12 and 13 and continuing reference to FIG. 3, another plot illustrating power levels of an ROADM node during a simulated optimized power control process according to a FSM method in accordance with one implementation of the present principles is shown. As discussed above, in the FSM method according to one implementation of the present principles, the attenuation step size may be increased gradually to expedite the transient control process.

As shown in FIGS. 12 and 13, different transient times can result by applying different attenuation step strategies to the ROADM configuration illustrated in FIG. 3. During the first two OCM periods of the simulation, the input power fluctuates from 2 dBm to 5 dBm, and 20 nodes, for example nodes 100-11 to 100-30 of FIG. 3, transition to inactive states. In the simulation depicted in FIG. 12, the attenuation step size increases by 0.1 dB every two OCM periods. The ripples range from 2.8 dBm to 0.9 dBm, and the transient time is 10 OCM periods (100 seconds).

In the simulation depicted in FIG. 13, another attenuation strategy is used in which the step size is increased by 0.1 dB in every OCM period. As a result, the ripples range from 2.8 dBm to 0.7 dBm, and the transient time is 9 OCM periods (90 seconds).

Comparison of the plots provided in FIGS. 12 and 13 with that of FIG. 11, has demonstrated that a FSM method in accordance with one implementation of the present principles may reduce the transient time by nearly 70%, and may reduce the power ripples by more than 50% (54% in FIG. 12 and 58% in FIG. 13). In addition, the power oscillation may also be significantly reduced. As a result, optical signal quality is improved throughout the network and data loss may be prevented.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

Having described preferred embodiments of a system and methods (which are intended to be illustrative and not limiting), it is noted that modifications and variations can be made by persons skilled in the art in light of the above teachings.

For example, in wavelength division multiplexing networks, amplifier transient effects, which may be caused by power fluctuations in the network, have a severe impact on signal quality and data loss. Due to control limitations in amplifiers, the transient time, in which per-channel optical power is abnormal, may last several tens to even hundreds of seconds. The system and methods described above with respect to controlling power fluctuations in a network by adjusting attenuation levels in ROADM nodes may also be implemented by adjusting amplification levels in amplifiers to reduce the transient time of power fluctuations.

It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for controlling power fluctuations in a wavelength division multiplexing network having a plurality of nodes comprising:
   modifying a power input of a first node at a modification level to maintain a power output of the first node within a threshold range;
   adjusting the modification level at the first node in accordance with an active state in which the modification level is adjusted in response to determining that a power level at the first node is outside the threshold range;
   in response to determining that a power change over consecutive first time periods at the first node exceeds a first power change threshold, transitioning the first node from an active state to an inactive state in which the modification level is fixed, wherein the transition is made to reduce the time in which the power level at the first node is stabilized within the threshold range; and
   wherein the adjustment in the active state reduces the difference between the power level at the first node and a power output level within the threshold range, and wherein the power output of the first node during the transition is outside the threshold range.

2. The method of claim 1 further comprising the step of:
   transitioning the first node from the inactive state to the active state in response to at least one of:
   a) detecting a power change over consecutive second time periods at the first node that is less than a second power change threshold and determining that a power change over consecutive second time periods at an adjacent node is less than the second power change threshold; and
   b) detecting a power change at the first node that is greater than a third power change threshold and determining that the power change over consecutive third time periods at the adjacent node is less than the third power change threshold.

3. The method of claim 2, wherein the first node and the adjacent node are cascaded, reconfigurable add/drop multiplexers in an optical network, wherein the first node and the adjacent node communicate via an optical supervisory channel and wherein the modifying comprises attenuating a signal received by the first node and the modification level corresponds to an attenuation level.

4. The method of claim 1, wherein the adjustment of the modification level is performed and repeated at a second, upstream node, thereby adjusting the power level at the first node to a level within the threshold range.

5. The method of claim 1, wherein the adjustment to the modification level in the active state is made in steps and repeated over consecutive time periods.

6. The method of claim 1, wherein the adjustment to the modification level in the active state is made in step sizes that increase over consecutive time periods.

7. The method of claim 1, wherein the fixed modification level is equal to a modification level applied while the power output of the first node was within the threshold range.

8. The method of claim 1, wherein the power output of the first node is the power of a signal output by the first node on a first channel, wherein the first node receives and transmits signals on a plurality of independent channels, and wherein the first node is capable of being simultaneously in an active state for the first channel and an inactive state for a second channel.

9. A system for controlling power fluctuations in a wavelength division multiplexing network having a plurality of nodes comprising:
a power modification module configured to modify a power level of at least one signal received by at least one input port of a corresponding node at a modification level to maintain the power level of the at least one signal output by the corresponding node within a threshold range;
a power monitoring module configured to monitor the power of signals transmitted through at least one port of the corresponding node; and
a control unit configured to control the power modification module by:
adjusting the modification level in accordance with an active state in which the modification level is adjusted in response to determining via the power monitoring module that the power level of the at least one signal output by the corresponding node is outside the threshold range,
in response to determining via the power monitoring module that a power change over consecutive first time periods of the at least one signal output by the corresponding node exceeds a first power change threshold, transitioning the corresponding node from an active state to an inactive state in which the modification level is fixed, wherein the transition is made to reduce the time in which the power of the at least one signal output by the corresponding node is stabilized within the threshold range; and
wherein the adjustment in the active state reduces the difference between the power level of the at least one signal output by the corresponding node and a power level within the threshold range, and wherein the power level of the at least one signal output by the corresponding node during the transition is outside the threshold range.

10. The system of claim 9, further comprising:
at least one node communication channel,
wherein the control unit is further configured to transition the corresponding node from the inactive state to the active state in response to at least one of:
a) detecting a power change over consecutive second time periods of the at least one signal at the corresponding node that is less than a second power change threshold and determining via the at least one node communication channel that a power change over consecutive second time periods of the at least one signal at an adjacent node is less than the second power change threshold; and
b) detecting a power change of the at least one signal at the corresponding node that is greater than a third power change threshold and determining via the at least one node communication channel that the power change over consecutive third time periods of the at least one signal at the adjacent node is less than the third power change threshold.

11. The system of claim 10, wherein the corresponding node and the adjacent node are cascaded, reconfigurable add/drop multiplexers (ROADM) in an optical network, the control unit is a reconfigured ROADM management system, the power monitoring module is an optical channel monitoring module, the at least one node communication channel is at least one optical supervisory channel, the modifying comprises attenuating the at least one signal and the modification level corresponds to an attenuation level.

12. The system of claim 9, wherein the adjustment of the modification level is performed and repeated at an upstream node, thereby adjusting the power of the at least one signal output by the corresponding node to a level within the threshold range.

13. The system of claim 9, wherein the adjustment to the modification level in the active state is made in steps and repeated over consecutive time periods.

14. The system of claim 9, wherein the adjustment to the modification level in the active state is made in step sizes that increase over consecutive time periods.

15. The system of claim 9, wherein the fixed modification level is equal to a modification level applied while the power level of the at least one signal output by the corresponding node was within the threshold range.

16. The system of claim 9, wherein the at least one signal is transmitted on a first channel, wherein the corresponding node receives and transmits signals on a plurality of independent channels, and wherein the corresponding node is capable of being simultaneously in an active state for the first channel and an inactive state for a second channel.

17. A method for controlling power fluctuations in a wavelength division multiplexing network having a plurality of nodes comprising:
modifying a power input of a first node at a modification level to maintain the power output of the first node within a threshold range;
adjusting the modification level at the first node in accordance with an active state in which the modification level is adjusted at a first adjustment degree in response to determining that the power level at the first node is outside the threshold range, wherein the adjustment reduces the difference between the power level at the first node and a power level within the threshold range; and
in response to determining that a power change over consecutive first time periods at the first node exceeds a first power change threshold, transitioning the first node from an active state to an inactive state in which the modification level is adjusted at a second adjustment degree, wherein the magnitude of second adjustment degree is less than the magnitude of the first adjustment degree, wherein the power output of the first node during the transition is outside the threshold range, and wherein the transition is made to reduce the time in which the power output of the first node is stabilized within the threshold range.

18. The method of claim 17 further comprising the step of:
transitioning the first node from the inactive state to the active state in response to at least one of:
a) detecting a power output change over consecutive second time periods of the first node that is less than a second power change threshold and determining that a power output change of an adjacent node over consecutive second time periods is less than the second power change threshold; and b) detecting a power output change of the first node that is greater than a third power change threshold and determining that the power output change of the adjacent node over consecutive third time periods is less than the third power change threshold.

* * * * *